(No Model.)
C. J. COLEMAN.
LINEMAN'S SOLDERING APPARATUS.
No. 549,183. Patented Nov. 5, 1895.
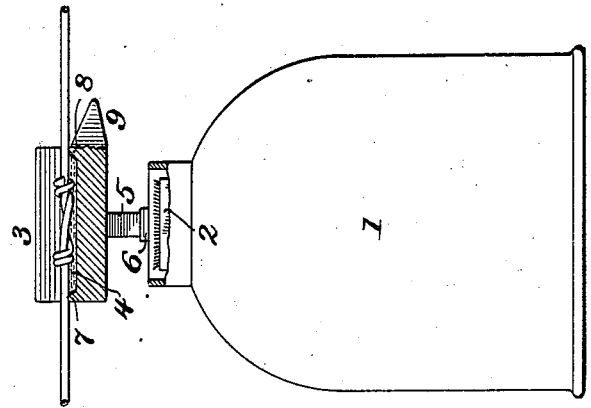
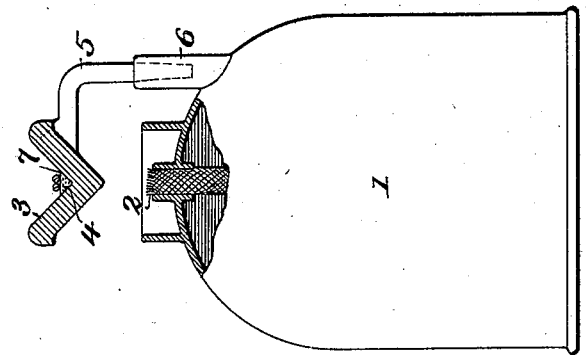
Attest:
Geo H Arthur
H. Watson.
Inventor:
Clyde J. Coleman:
by Robert Burns
Attorney.

UNITED STATES PATENT OFFICE.

CLYDE J. COLEMAN, OF CHICAGO, ILLINOIS.

LINEMAN'S SOLDERING APPARATUS.

SPECIFICATION forming part of Letters Patent No. 549,183, dated November 5, 1895.

Application filed January 30, 1895. Serial No. 536,696. (No model.)

*To all whom it may concern:*

Be it known that I, CLYDE J. COLEMAN, a citizen of the United States, residing at Chicago, in the county of Cook and State of Illinois, have invented a certain new and useful Improvement in Linemen's Soldering Apparatus; and I do hereby declare the following to be a full, clear, and exact description of the same, reference being had to the accompanying drawings, forming a part of this specification.

This invention relates to that class of soldering appliances used by electric linemen in making solder joints in electric-line wires. Heretofore in this class of work the ordinary gasoline-torch has been most generally used to heat the wires and melt the solder, and necessarily required the use of both hands of the lineman. This mode of working solder joints is not only slow and difficult, but is also objectionable on the further grounds that the flame used in heating the particular wires was very liable to injure the insulation of any adjacent wires, as well as the adjacent insulation of the particular wires being soldered, which in either case would be due to the natural spreading of the flame of the gasoline-torch.

The present improvement accordingly has for its object to provide a simple, cheap, and convenient apparatus by which such soldering of the line-wires can be quickly and rapidly attained without any liability to injury to the adjacent insulation of such wires or that of any wires adjacently arranged.

I attain such objects by the construction and arrangement of parts illustrated in the accompanying drawings, in which—

Figure 1 is a side elevation, partly sectionalized, illustrating my present improved soldering appliance; Fig. 2, a front elevation of the same with parts in section.

Similar numerals of reference indicate like parts in both views.

Referring to the drawings, 1 represents a hand-lamp of any usual and suitable form, having a burner 2, preferably of the flat-wick type, as shown.

3 is a spreader-piece formed with an elongated solder-containing channel 4 in its upper surface and arranged in a superimposed position above the burner 2, it being supported in such position by any usual and suitable means—such, for instance, as a laterally-arranged downwardly-projecting finger 5, entering a socket-post 6 on the lamp-body 1, as shown.

In the present device the elongated solder-containing channel 4 is adapted to hold a narrow and extended body of solder, so as to suit the nature of the wire-joint being soldered; and in order to render the apparatus more convenient and efficient it is preferable to construct the spreader-piece 3 of a substantially V-shaped form arranged in a substantially-horizontal position, its opposite ends being open to admit of the line-wire joint being introduced into the trough, such end being, however, partially closed by end dams 7 and 8, so as to form the solder-containing reservoir 4 at the bottom of the trough 3 to afford the necessary amount of solder required in making a joint.

9 is a pouring-ledge or soldering-point that will usually be formed by an extension of the dam 8, and which is intended to afford a ready means for use in flowing solder upon the joint or in finishing the same in the manner of a soldering-iron, or for any other ordinary uses that may suggest themselves. This ledge or point 9 will be of any suitable form, preferably, however, of a tapering form, as shown, and may be counterpart of the point portion of an ordinary soldering-iron.

Having thus fully described my said invention, what I claim as new, and desire to secure by Letters Patent, is—

1. In a lineman's soldering apparatus, the combination of a lamp 1, having a burner 2, and a spreader piece 3, superimposed above the burner, and formed with an elongated open topped solder containing cavity, and longitudinally extending side walls that project above the sides of said solder containing cavity, substantially as set forth.

2. In a lineman's soldering apparatus, the combination of a lamp 1, having a burner 2, and a spreader piece 3, superimposed above the burner and formed with an elongated open topped solder containing cavity, and longitudinally extending side walls that project above the sides of said solder containing cavity, and an end pouring ledge or soldering point 9, substantially as set forth.

3. In a lineman's soldering apparatus, the combination of a lamp 1, having a burner 2, and an open ended trough shaped spreader 3, superimposed above the burner, and having a V form and provided with an elongated solder chamber at its bottom, substantially as set forth.

4. In a lineman's soldering apparatus, the combination of a lamp 1, having a burner 2, and an open ended trough shaped spreader 3, superimposed above the burner, and having a V form, and dams 7 and 8, forming an elongated solder chamber at its bottom, substantially as set forth.

5. In a lineman's soldering apparatus, the combination of a lamp 1, having a burner 2, and an open ended trough shaped spreader 3, superimposed above the burner and having a V form, and provided with a solder chamber, at the bottom, and pouring ledge or soldering point 9, at one end, substantially as set forth.

6. In a lineman's soldering apparatus, the combination of a lamp 1, having a burner 2, and an open ended trough shaped spreader 3, superimposed above the burner, and having a V form, dams 7 and 8, forming a solder chamber at its bottom, and a pouring ledge or soldering point 9, at one end, substantially as set forth.

7. In a lineman's soldering apparatus, the combination of a lamp 1, having a burner 2, and an open ended trough shaped spreader 3, supported above the burner by means of the laterally and downwardly projecting finger 5, engaging the socket piece 6, on the lamp body, substantially as set forth.

In testimony whereof witness my hand this 21st day of January, 1895.

CLYDE J. COLEMAN.

In presence of—
ROBERT BURNS,
GEO. H. ARTHUR.